United States Patent [19]

Haddad et al.

[11] 4,125,467

[45] Nov. 14, 1978

[54] LIQUID-SOLIDS SEPARATOR

[75] Inventors: Philip O. Haddad, Alvin; Kenneth R. Colura, Lake Jackson, both of Tex.

[73] Assignee: The Dow Chemical Company, Midland, Mich.

[21] Appl. No.: 765,183

[22] Filed: Feb. 3, 1977

[51] Int. Cl.² ............................................. B01D 21/02
[52] U.S. Cl. ...................... 210/83; 210/528; 210/532 R
[58] Field of Search ........... 210/83, 513, 532 A, 532 S, 210/533, 534, 528, 65; 261/DIG. 72

[56] References Cited

U.S. PATENT DOCUMENTS

| | | | |
|---|---|---|---|
| 1,403,311 | 1/1922 | Gaillet | 210/513 X |
| 2,353,602 | 7/1944 | Trotter | 210/83 X |
| 3,293,174 | 12/1966 | Robjohns | 261/DIG. 72 X |
| 3,770,131 | 11/1973 | Davis et al. | 210/532 A X |
| 3,956,128 | 5/1976 | Turner | 261/DIG. 72 X |

*Primary Examiner*—William A. Cuchlinski, Jr.
*Attorney, Agent, or Firm*—M. W. Barrow

[57] ABSTRACT

Apparatus and method for gravitational separation of solids and liquid from a suspension wherein the suspension is flowed through a multiplicity of non-connected, substantially non-nesting contactors whose external surfaces are substantially non-planar to facilitate contact of the suspension with more contactor surfaces and to prevent the alignment of the contactors in such a manner so as to present the suspension flow with substantially horizontal or substantially vertical contact surfaces.

14 Claims, 8 Drawing Figures

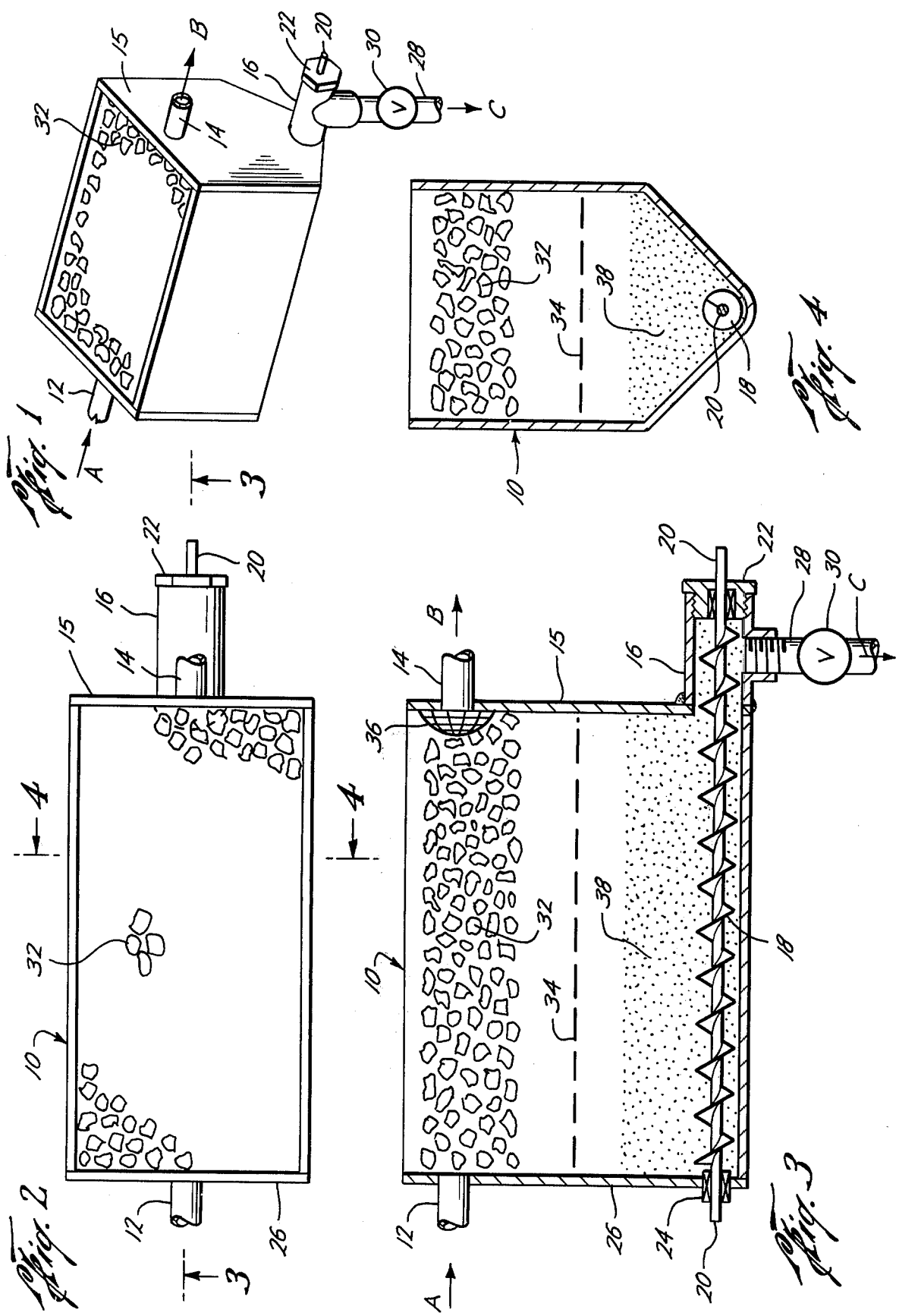

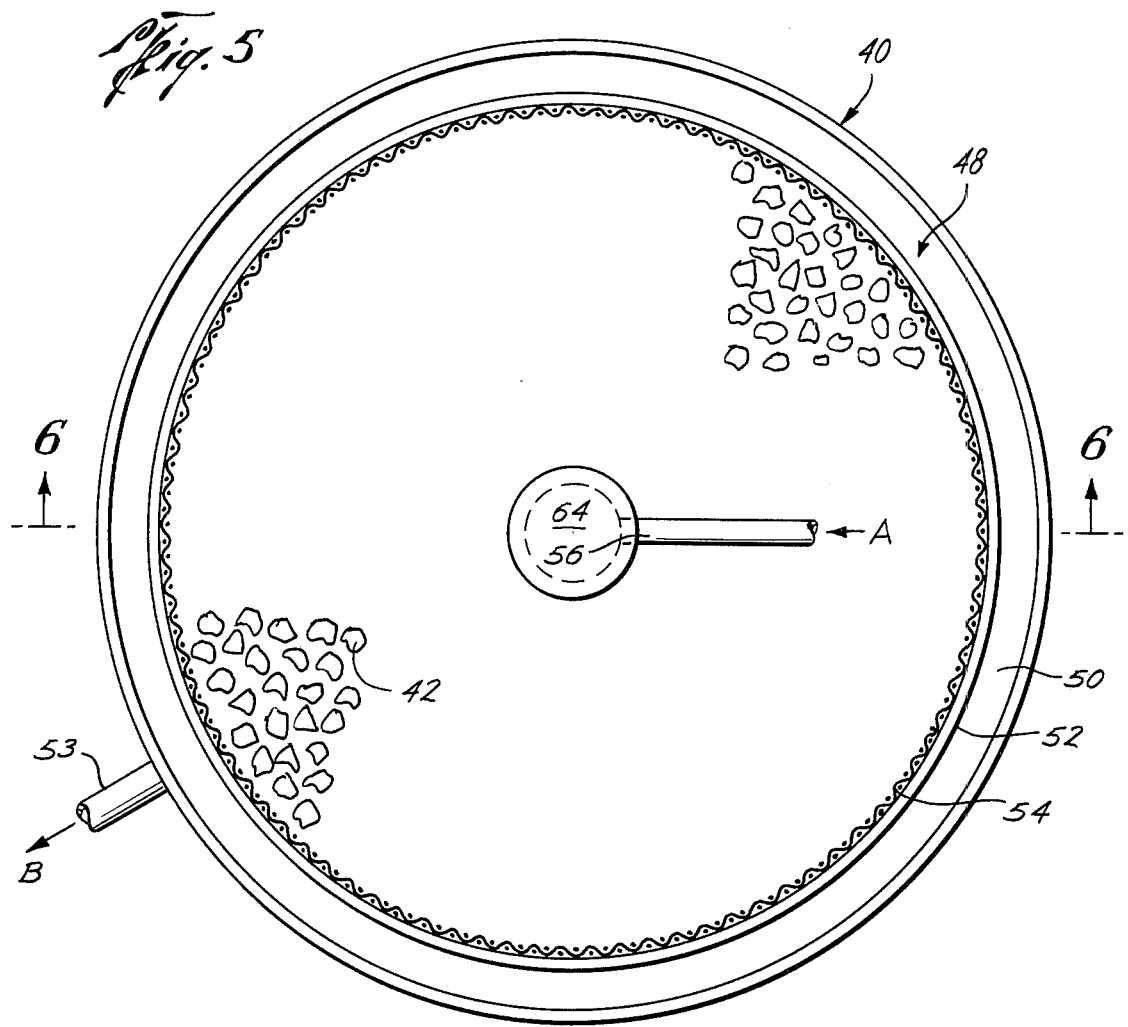
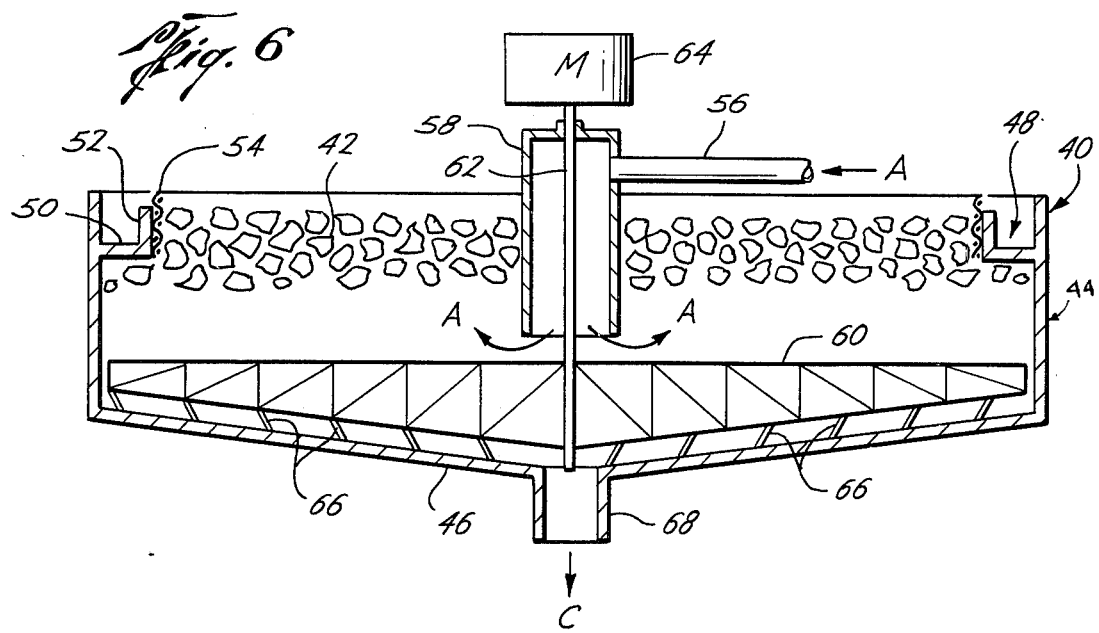

LIQUID-SOLIDS SEPARATOR

BACKGROUND OF THE INVENTION

The separation of the solids from the liquid of a suspension has long been a problem in many fields of human endeavor. Large settling ponds have been used wherein the suspension was allowed to stand until the solid had settled to the bottom, leaving the liquid clear and ready to be removed. An improvement on these ponds was the Dorr pond wherein the suspension is flowed very slowly from an inlet in the center of the pond outward to the periphery of the pond. During this very slow motion, the solids settle to the bottom and the clarified liquid flows over a peripheral levee around the pond into a catch basin or trough.

Furthermore, liquid-solid suspension separators have been invented which are much smaller in volumetric size than the Dorr settling ponds while still retaining the separating capacity of the larger settling ponds. In general these more compact separators are built according to one of two basic designs, the inclined plane design and the fixed vane design.

Basically, in the inclined plane design, the separator has a multiplicity of fixed, equally spaced, parallel, planar surfaces, extending from side to side of the separator while extending from top to bottom of the separator at a pre-selected incline angle. The suspension is then run through these separators in such a fashion so as to be divided into many flow paths between the fixed, planar surfaces.

It is known that the contacting of "false bottoms", such as these planar surfaces, will cause the gravitational separation of the liquid from the solid of the suspension at a much faster rate than in settling ponds. The solids are generally denser than the liquid. Thus, upon separation from the liquid these denser solids slide down these false bottoms, or inclined planar surfaces, to the bottom of these more compact separators where they are collected. For examples of these type of separator see U.S. Pat. Nos. 3,552,554; 3,494,475; and 3,794,167.

The fixed vane type of compact separator is similar to the inclined plane design in that it offers a multiplicity of false bottoms to a flowing suspension, and in that the vanes are permanently affixed within the separator at predetermined positions. Unlike the planes of the inclined plane type of separator, the vanes of the fixed vane type do not extend the length of the separator from top to bottom.

In any event, both of these types suffer several disadvantages.

For example, to construct a suitable separator, it is usually necessary for the manufacturer to take a sample of the particular suspension to be separated, and then fabricate the separator according to the parameter of the proposed flow rate of the suspension and the properties of the particular suspension.

In any event once these types of separators are fabricated their false bottoms are permanently fixed in place and can not be readily adjusted in field usage as changing conditions sometimes dictate.

It would be advantageous to have a liquid-solid separator which is readily field adjustable. Moreover, it would be advantageous to have a method wherein settling pond separators such as Dorr pond separators could be improved. These and other advantages are realized in the present invention.

SUMMARY OF THE INVENTION

This invention is an adjustable liquid-solids separator and a method for separating the solids from the liquid of a suspension.

The adjustable separator comprises a container having:

(a) at least one inlet means for the suspension to enter the container;

(b) at least one outlet means for the separated liquid to exit;

(c) a multiplicity of unconnected, non-nesting contactors confined in the container, which preferably will float in the suspension, with said contactors being located substantially in at least one volumetric cross-section of the flow path of a suspension being passed through the container between the suspension inlet means and the liquid outlet means, to cause the suspension to pass through the contactors, with said contactors having substantially non-planar surfaces; and (d) an opening means in the container through which passage of contactors can be achieved for adjustment of the clarity of the liquid of the suspension leaving the container through the liquid outlet means.

The method of this invention for separating the liquid from the solids of a flowing suspension in a manner such that ready adjustment of the degree of separation of the solids from the liquid can be obtained comprises the steps of:

(a) flowing the suspension through a container in which are maintained a multiplicity of disconnected, substantially non-nesting contactors in at least one cross-sectional volume of the flowpath of the suspension to cause the faster gravitational separation of the liquid and solids, with said contactors having contact surfaces which are substantially non-planar;

(b) observing the degree of separation of the liquids and solids of the suspension after it has passed through the contactors; and (c) adjusting the contactors until the desired degree of separation is achieved.

BRIEF DESCRIPTION OF THE DRAWING

Further features and advantages of the invention will become more apparent from the following specification when taken in connection with the drawing wherein:

FIG. 1 is an isometric view of an adjustable liquid-solids separator through which is flowing a suspension of solids in a liquid, said suspension having a greater density than the contactors of the separator so that said contactors float in said suspension;

FIG. 2 is a top view of the separator of FIG. 1;

FIG. 3 is a cross-sectional side view of the separator of FIGS. 1 and 2 taken along the plane indicated by line 3—3 in FIG. 2;

FIG. 4 is a cross-sectional end view of the separator of FIGS. 1 and 2 taken along the plane indicated by line 4—4 in FIG. 2.

FIG. 5 is a top view of a Dorr type thickening pond shown improved by the addition of a multiplicity of contactors which float in the pond;

FIG. 6 is a cross-sectional side view of the pond of FIG. 5 taken along the plane indicated by line 6—6 in FIG. 5;

DETAILED DESCRIPTION

Figure 7:
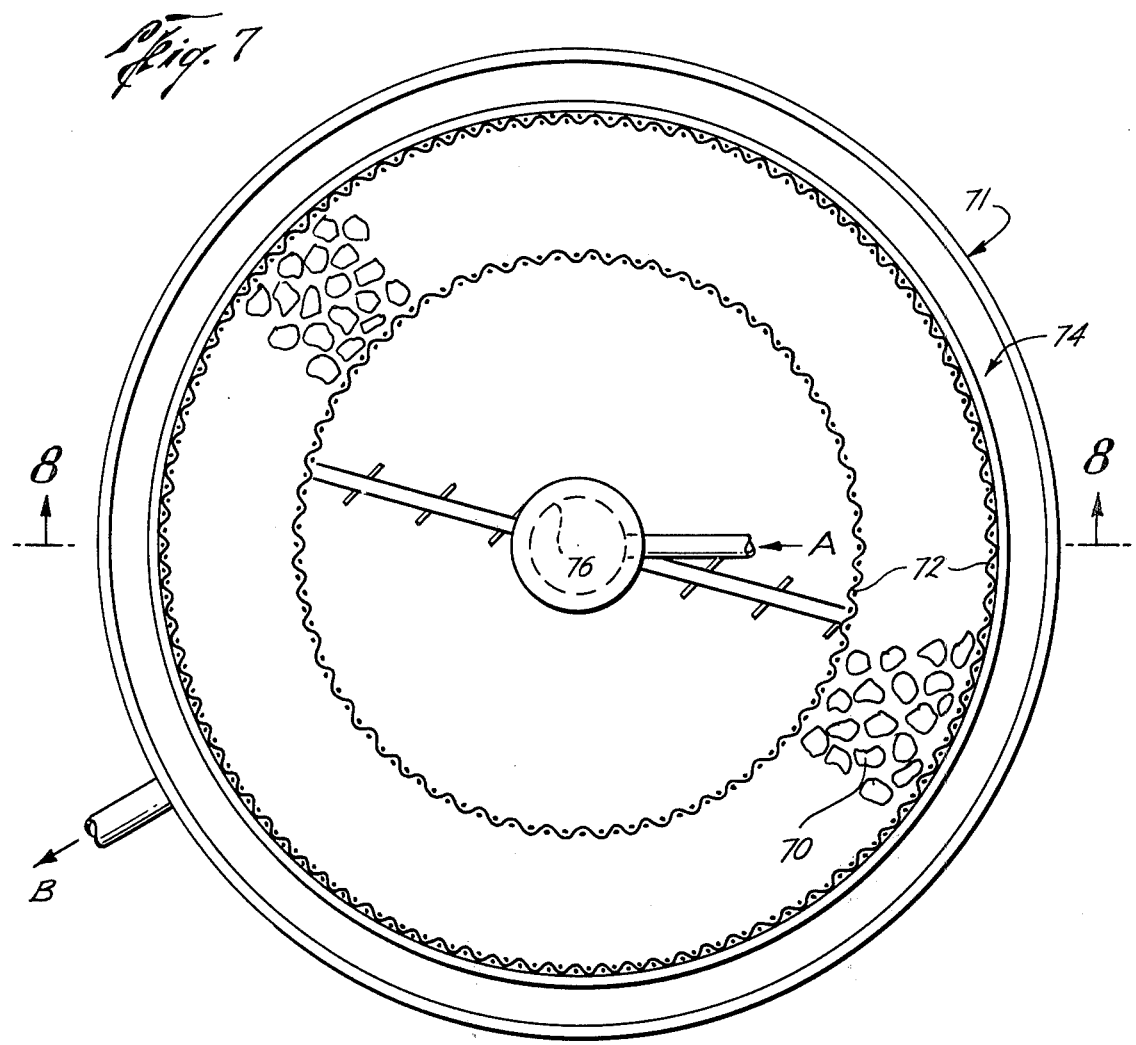
FIG. 7 is a top view of a Dorr type thickener pond shown improved by the addition of contactors to the pond with said contactors being restrained to an annular volumetric cross section of the pond by a wire cage located inside and adjacent to the upper periphery of the pond.
Figure 8:
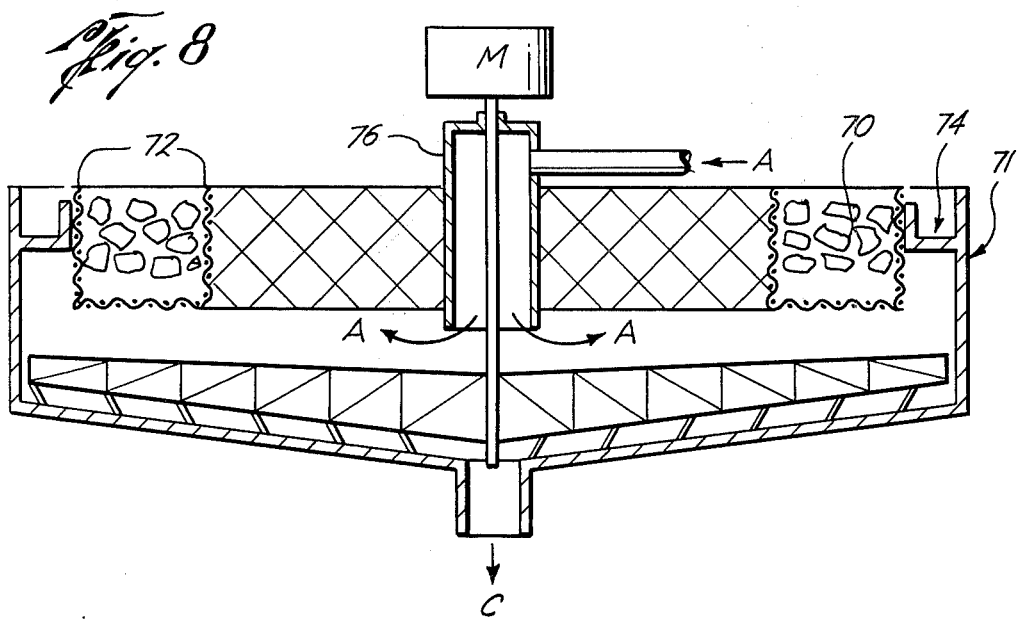
FIG. 8 is a cross-sectional side view of the separator of FIG. 7 taken along the plane indicated by line 8—8 in FIG. 7.

Referring to the drawing, FIGS. 1-4 illustrate one embodiment of the invention while FIGS. 5 and 6 illustrate another embodiment, and FIG. 7 and 8 illustrate yet another embodiment.

The embodiment in FIG. 1-4 is as follows. A container, denoted in general by the numeral 10, has an open top. It has a suspension inlet pipe 12 attached which is in fluid communication with the interior of the container 10. On the opposite end, the container 10 has a liquid outlet pipe 14 attached which is also in fluid communication with the interior of the container 10. Attached to end plate 15 of the container 10, located near its bottom, is pipe "T" fitting 16. This "T" fitting 16 has a dual purpose. It serves as an outlet means for solid material which settles out from a suspension in container 10 into the bottom of container 10 and as a support and seal for an auger 18 located within the bottom of the container 10. The auger is driven by a motor (not shown) which rotates the auger through a drive shaft 20. Drive shaft 20 is connected to the motor drive means (not shown) through a plug pipe fitting 22 screwed into the T fitting 16 with said plug pipe fitting 22 having a sealed base hole through which the drive shaft 20 passes. The drive shaft 20 also serves as a support shaft for the auger 18. Auger 18 is maintained in place within container 10 by having the drive shaft 20 pass through a sealed bearing surface 24 made within end plate 26 of container 10. As can be seen from FIG. 4 this embodiment has the bottom of container 10 sloping downward in a "V" shape. This "V" shaped bottom uses the settling solids to slide into a more concentrated volume, i.e. the bottom of the "V", which makes removal of the solids easier than it would be if they were spread out over a flat bottom. In the lower part of this "V" shaped bottom is located the solids removal means, i.e. the auger 18.

To the bottom outlet of pipe T fitting 16 is screwed outlet pipe 28. Valve 30 is interposed in outlet pipe 28 and can be open and closed manually or automatically.

Contactors, denoted by numeral 32, are placed in container 10 by passing them into the container through its open top. These contactors 32 can be made of practically any material, e.g. plastic, glass, wood, or porcelain. They can be made in any non-nesting shape to prevent channeling of fluid passage between them.

When passing a liquid-solid suspension into the container 10, the surfaces of the contactors 32 should present neither a substantially uniform verticle surface nor a substantially uniform horizontal surface to the flowpath of the suspension. Contactors with substantially non-planar external surfaces meet these latter requirements. It has been found that loose-fill (or random) tower packing very adequately meet these two criteria of non-nesting and substantially non-planar surfaces. Common names of examples of such column packing are: Intalox Saddles, Berl Saddles, Triple Spiral Rings, Double Spiral Rings, Single Sprial Rings, Pall Rings, Cross-Partition Rings, Lessing Rings, Rachig Rings, and MASPAC* dump type packing. The following U.S. Patents illustrate types of such loose-fill tower columns packing and are hereby incorporated herein by reference: U.S. Pat. Nos. 1,141,266; 1,307,635; 1,360,928; 1,480,463; 1,494,989; 1,503,208; 1,725,429; 1,796,501; 2,037,317; 2,055,162; 2,212,932; 2,332,110; 2,639,909; 2,949,934; 3,159,910; 3,167,600; 3,311,356; 3,364,656; 3,365,180; 3,506,248; 3,567,192; 3,589,687 and 3,752,453.

*MASPAC is a trademark of The Dow Chemical Company.

The above lists are merely illustrative of, but not limiting of, the variety of types contactors which may be used in this invention. Suitable contactors are those which are non-nesting, which are not connected to each other, and which have contact surfaces which are substantially non-planar. A multiplicity of these contactors are needed to perform an adequate separation of solids from a liquid-solid suspension. A minimum of about 10 per cubic foot of streampath volume is needed in order to obtain an appreciable amount of separation of the liquid and solids of a suspension. Usually many more contactors per cubic foot are desirable.

It is convenient if the contactors have a smaller density than the liquid of the suspension so that the contactors will float in the suspension. This ability of the contactors to float is not necessary, however, in every case since a screen wire support 34 can be easily installed in the container 10 in a substantially horizontal position so as to support any non-floating contactors.

The separator is readily adjustable in that the number, type, and size of contactors can be easily changed by removing the contactors 32 in the container 10 and replacing them with others. The separator is also readily adjustable in that contactors can be easily added to those already present and are removed through the open top of container 10.

(Shown in FIG. 3) covers the opening of liquid outlet pipe 14 to prevent any contactors 32 from flowing out of container 10 through pipe 14.

The separator of FIGS. 1-4 works as follows. Valve 30 is closed and the motor (not shown) which drives the auger 18 through the auger driver shaft 20 is cut off. A suspension of solids and liquid is flowed into container 10 through inlet pipe 12 as the arrow identified as A indicates. Upon entering container 10, the suspension fills the container 10 to the level of the liquid outlet pipe 14 through which it can flow out. The contactors 32 in the embodiment shown in FIGS. 1-4 are chosen so that they will float in the suspension in container 10. In this way they are always interposed in the flowpath of the suspension between suspension inlet pipe 12 and liquid outlet pipe 14.

As the suspension containing liquids and solids enters the container 10 through inlet pipe 12, it encounters the first of the contactors 32. The non-planar surfaces of these contactors 32 deflect the flow of the suspension in many random directions against other contactors 32. The non-planar surfaces of these contactors 32 further randomly deflect the flow of the suspension. This deflection of the flow of the suspension amongst and against the contactors 32 continues until the suspension reaches the outlet pipe 14.

It is known that the impingement of a suspension upon a solid inclined planer surface causes the solids suspended in the liquids of the suspension to tend to separate from the liquid and settle to the bottom. By placing a number of surfaces in the flowpath, the solids separate from the liquid much faster in a much smaller volume than in settling ponds having no surfaces other than the sides and bottom. The use of a multiplicity of disconnected contactors 32 as these surfaces allows the clarity of the liquid leaving the container 10 through liquid outlet pipe 14 in the direction of arrow B to be easily adjusted by changing the amount, type, or size of contactors 32. Contactors 32 can be added to the container by merely dumping in more contactors 32 through the top of the open top of container 10. They can be removed by merely scooping them out of the container 10 through its open top. Thus if the clarity of the liquid leaving container 10 is insufficient more contactors can be added until the desired clarity is obtained.

Also changing the type of suspension flowing through the separator can be compensated for by adjusting the amount, type, or size of the contactors until a satisfactory clarity is achieved. For example changing the suspension from one of $Mg(OH)_2$ particles in water to a suspension of sand in water, or to a suspension of sewage, would likely require adjustment of the contactors 32. Further, merely changing the particle size or concentration of solids in the same type suspension would likely require adjustment of the contactors 32.

As the suspension flows through container 10, amongst the contactors 32, the solids of the suspension settle to the bottom of container 10. In the bottom it collects as sediment 38 until enough has collected to warrant removal. Then flow of the suspension into container 10 through inlet pipe 12 is stopped. Valve 30 is opened, and the sediment 38 of solids is removed from container through pipe "T" fitting 16 pipe 28, and valve 30. This removal is accomplished by rotating auger 18 in a direction so as to transfer the settled solids of the sediment 38 to the interior of the pipe "T" fitting 16. From the interior of the pipe fitting the solids fall through pipe 28 and value 30 into a suitable collecting device (not shown). If desired, a suction pump (not shown) can be connected to the end of pipe 28 to aid in the removal of sediment from the container 10.

A second and third preferred embodiments of this invention are illustrated in FIGS. 5-6 and FIGS. 7-8, respectively.

In FIGS. 5 and 6, a Dorr type thickner, or settling pond, is shown. The pond will be referred to as 40. It is shown as being improved by having contactors 42 floating in the suspension to be clarified in the pond 40. These contactors 42 have the same properties as do the contactors 32 described above for the embodiment described for FIGS. 1-4. The pond 40 has an outer annular peripheral wall 44 and a bottom 46 sloped downward toward the center of the pond 40. An overflow trough 48 is made inside the pond wall 40 by attaching an annular horizontal shelf 50 to the interior of the wall 40 about one-fourth of the way down the wall 40, and attaching a vertical annular lip 52 to the interior edge of the horizontal shelf 50. The top of the lip 52 is somewhat lower than the top of the side wall 40. An outlet pipe 54 is connected through the side wall 40 to the trough 48 to act as a drain for trough 48. A wire screen 54 is vertically attached to the lip 52 so that the contactors 42 can not overflow into the trough 48.

The general flow of a suspension through the pond is as follows. The suspension containing solids suspended in a liquid, such as $Mg(OH)_2$ suspended in water, enters the pond 40 through pipe 56. From pipe 56 the suspension passes into and through conduit 58 into the lower portion of the center of the pond 40 in the direction of the arrows A. The inlet pipe 56 and conduit 58 are suspended by a means not shown, but types of which are well known to those skilled in the art. See Perry's Chemical Engineering Handbook, 3d. Ed., pp. 937-50 McGraw Hill, New York (1950). The suspension flows through the contactors 42 toward trough 48.

As the suspension flows through the contactors 42 it is deflected among the many contactors 42. As described above for the flow of the suspension through the contactors 32 of the embodiment in FIGS. 1-4, the flow of the suspension through and amongst the contactors 42 of this embodiment (FIGS. 5-6) causes the solids to separate from the liquid much faster than occurs without the contactors 42. Thus the flowrate of the suspension through the pond 40 can be increased or the volume of the pond 40 can be reduced and still give the same separating efficiency.

As the solids from the suspension settle to the bottom 46 of the pond 40 the liquid of the suspension flows through screen 54, over lip 52, into trough 48, and out of the pond through pipe 53 in the direction of arrow B. The clarity of this liquid can be adjusted by adding or subtracting contactors 42 to the pond, or changing types of contactors 42, or changing sizes of the same type of contactors 42. The addition of more contactors, the use of types of contactors which give more deflections of the flowpath and thereby more contacts of the suspension with the contactors 42 before it reaches the trough, or the use of smaller contactors 42 of the same type increase the clarity of the liquid before it overflows into the trough 48.

The solids that settle to the bottom 46 of the pond 40, are removed by any convenient removal means. In the embodiment of FIG. 5 and FIG. 6, there is used a well known raker arm system. This system has two raker arms 60 mounted on shaft 62 (FIG. 6). The shaft 62 is supported by and driven by motor 64 at a very slow rate of speed to rotate the raker arms 60. Motor 64 is supported by a means not shown. To the bottom of the two raker arms 60 are attached a multiplicity of plows 66. Raker arms 60 and plows 66 are not shown in FIG. 5. Plows 66 are attached at such a non-perpendicular angle to the raker arms 60 so as to cause the settled solid particles to move toward the center of the bottom of the pond 40 as the raker arms 60 rotate. At the center of the sloped pond bottom 46 there is a downflow conduit 68 through which the solids can fall in the direction of the arrow C.

The embodiment of the invention illustrated in FIGS. 7 and 8 is a Dorr pond which functions and is made like the embodiment shown in FIGS. 5 and 6 with the following exception. Instead of spreading the floating contactors 70 of this embodiment throughout the pond 71 as are the floating contactors 42 in FIGS. 5 and 6, in this pond 71 the contactors 70 are confined to an open-topped screen cage 72 attached to the trough 74 of the pond 71. The cage 72 circles the interior of the entire pond 71, thus completely transversing a volumetric cross-section of the flowpath that the suspension must take from the bottom of the outlet conduit 76 to the trough 74.

Because the flowrate of the suspension flowing from a center of a pond to its periphery is necessarily slower nearer the periphery than the center, the peripheral area is a preferred separating location. If contactors are not needed throughout a complete pond to satisfactorily separate the liquid from the solids of a suspension, a volumetric cross-section of contactors 70 can be interposed anywhere in the streampath of the suspension in the pond 71. Preferably the location of this section is at or near the periphery of the pond 71 as is the screen cage 72 in FIGS. 7 and 8. However, any volumetric cross-section of the streampath other than this one at the periphery of the pond 71 will improve the separation performing of the pond 71.

The clarity of the liquid overflowing into trough 74 is adjusted as is done in the embodiments in FIGS. 1–4 and FIGS. 5–6. That is, the number, type, or size of the contactors are adjusted until the desired clarity of the liquid entering the trough 74 is achieved.

We claim:

1. An adjustable liquid-solids separator for separating the solids and liquids of a suspension which comprises a container having:
   (a) at least one inlet means for the suspension to enter the container;
   (b) at least one outlet means for the separated liquid to exit;
   (c) a multiplicity of unconnected, non-nesting contactors contained therein, with said contactors being located substantially in at least one volumetric cross-section of the flowpath of a suspension being passed through the container between the suspension inlet means and the liquid outlet means to cause the suspension to pass through the contactors, with said contactors having substantially non-planar surfaces; and
   (d) an opening means in the container through which passage of contactors can be achieved so that the contactors in the container can be easily changed in number, type, and size in order to achieve the desired clarity of the liquid leaving the container by the outlet means and to thereby make the separator readily field adjustable.

2. A separator as recited in claim 1 wherein the container further comprises a solids removal means and solids outlet means for removal of the solids from the container.

3. The separator recited in claim 2 wherein the solids suspended in the liquid are Mg(OH)$_2$ and the liquid is water.

4. A separator as recited in claim 1 wherein the contactors are of a lesser density than the suspension so that they will float in the suspension, and the density of the solids is greater than that of the liquid so that the solids will settle to the bottom of the container during separation.

5. A separator as recited in claim 1 wherein the contactors are loose-fill tower column packing.

6. A separator as recited in claim 4 wherein the solids of the suspension are magnesium hydroxide and the liquid is water.

7. A method for separating the solids from the liquid of a flowing suspension in a manner such that ready adjustment of the degree of separation of the solids from the liquid can be obtained, said method comprising:

(a) flowing the suspension through a container in which are maintained a multiplicity of disconnected, substantially non-nesting contactors in at least one cross-sectional volume of the flowpath of the suspension to cause the faster gravitational separation of the liquid and solids, with said contactors having contact surfaces which are substantially non-planar and a density less than the suspension;

(b) observing the degree of separation of the liquids and solids of the suspension after it has passed through the contactors; and (c) adjusting the contactors in number, size, and type until they produce the desired degree of separation of solids from the liquid of the suspension.

8. The method of claim 7 wherein the adjustment is made in the number of contactors in the container.

9. The method of claim 7 wherein the adjustment is made by changing the type of contactors in the container.

10. The method of claim 7 wherein the adjustment is made by changing the size of the contactors in the container.

11. The method of claim 7 wherein the solids which separate from the liquid are removed from the container following separation.

12. In settling ponds through which suspensions of liquids and solids are flowed at a slow rate from a suspension inlet means to a liquid outlet means in order to allow the solids of the suspension to separate from the liquid and settle to the bottom of the pond for collection and removal by a collection and removal means, the solids having a greater density than the liquid, the improvement which comprises maintaining a multiplicity of contactors in at least one volumetric cross-section of the flowpath through which the suspension must flow in the ponds, which contactors cause to solids to separate faster from the liquid, said contactors being disconnected and substantially non-nesting, and said contactors having substantially non-planar surfaces; and said contactors, because of their being disconnected, are readily adjustable in their number, type, and size so that the desired clarity of the liquid leaving through the liquid outlet means is achieved, thereby making the settling pond adjustable in the rate at which it can cause liquid-solid separation of a suspension flowing through it.

13. The improvement of claim 12 wherein the settling pond is a Dorr type thickener, and the suspension is comprised of water and magnesium hydroxide.

14. The improvement of claim 13 wherein the contactors have a density less than the suspension so that the contactors float in the suspension.

* * * * *

UNITED STATES PATENT AND TRADEMARK OFFICE
CERTIFICATE OF CORRECTION

PATENT NO. : 4,125,467
DATED : Nov. 14, 1978
INVENTOR(S) : Philip O. Haddad, et al.

It is certified that error appears in the above—identified patent and that said Letters Patent are hereby corrected as shown below:

Col. 4, line 33, A new paragraph should be started with
      --A screen 36-- then continue the sentence.

Col. 8, line 37 delete "to" and insert --the--.

Signed and Sealed this

Fifteenth Day of May 1979

[SEAL]

Attest:

RUTH C. MASON
Attesting Officer

DONALD W. BANNER
Commissioner of Patents and Trademarks